(12) United States Patent
Schüttler et al.

(10) Patent No.: US 6,386,594 B1
(45) Date of Patent: May 14, 2002

(54) CONNECTION ELEMENT FOR A COMPOSITE HOSE AND PROCESS FOR CONNECTING COMPOSITE HOSE

(75) Inventors: Peter Schüttler, Niefern-Öschelbronn; Armin Winter, Pforzheim, both of (DE)

(73) Assignee: Witzenmann GmbH Metallschlauch-Fabrik Pforzheim, Pforzheim (DE)

(*) Notice: Subject to any disclaimer, the term of this patent is extended or adjusted under 35 U.S.C. 154(b) by 0 days.

(21) Appl. No.: 09/535,191

(22) Filed: Mar. 27, 2000

(30) Foreign Application Priority Data

Mar. 27, 1999 (DE) .......................... 199 14 061

(51) Int. Cl.$^7$ ................................ F16L 33/00
(52) U.S. Cl. ................ 285/251; 285/256; 285/222.2; 285/222.4
(58) Field of Search ................ 285/256, 251, 285/222.2, 222.4

(56) References Cited

U.S. PATENT DOCUMENTS

| | | | |
|---|---|---|---|
| 1,933,769 A | 11/1933 | Steele | |
| 3,381,981 A | 5/1968 | Wilson | |
| 3,393,267 A | 7/1968 | Busse | |
| 3,964,772 A | 6/1976 | Cox, Jr. | |
| 3,992,044 A | 11/1976 | Muslin | |
| 4,548,430 A | * 10/1985 | Haubert et al. | 285/256 |
| 5,233,739 A | 8/1993 | Holden et al. | |
| 5,255,944 A | * 10/1993 | Blin et al. | 285/222.2 |
| 5,356,182 A | * 10/1994 | Sanders | 285/222.4 |
| 5,911,448 A | * 6/1999 | Feher | 285/256 |
| 6,106,027 A | * 8/2000 | Mulvey et al. | 285/222.2 |

FOREIGN PATENT DOCUMENTS

| | | | |
|---|---|---|---|
| DE | 702913 | | 2/1941 |
| DE | 0925506 | * | 3/1955 |
| DE | 196 35 053 A1 | | 3/1998 |
| FR | 67 525 | | 3/1958 |
| GB | 1345737 | * | 2/1974 | ........... 285/251 |
| GB | 2 064 694 A | | 6/1981 |

* cited by examiner

*Primary Examiner*—Lynne H. Browne
*Assistant Examiner*—Aaron Dunwoody
(74) *Attorney, Agent, or Firm*—Akin, Gump, Strauss, Hauer & Feld, L.L.P.

(57) ABSTRACT

A connection element is provided and a process for connecting composite hoses is conducted in a weld-free, solder-free, as well as site-independent manner, which nonetheless leads to an outside pressure-tight interface. For this purpose, a composite hose having a spiral wound metal hose surrounded by an elastic outer casing is screwed onto a supporting sleeve having a terminal outer thread. The metal tube is then compressed axially so that the outer casing is exposed projecting beyond the end of the metal hose and is preferably fastened by pressing on a sealing surface arranged behind the outer thread. The pressing of the outer casing here does not impair the functional capacity of the wound metal hose, but nevertheless protects it from the surrounding medium, for example salt water.

11 Claims, 2 Drawing Sheets ic connection element, CONNECTION ELEMENT FOR A COMPOSITE HOSE AND PROCESS FOR CONNECTING COMPOSITE HOSE

BACKGROUND OF THE INVENTION

The invention concerns a connection element for a composite hose having a spiral wound metal hose and an elastic outer casing, the connection element including a supporting sleeve having an outer thread adapted to the metal hose and engaging into spiraled depressions on the inner wall of the metal hose. The supporting sleeve also has an annular axial sealing surface bordering on the outer thread and spaced therefrom by a shoulder adapted to the outer casing of the composite hose. The invention is also directed to a process for connecting such a composite hose by setting an end of the composite hose to be connected on the supporting sleeve of the connection element, screwing the wound metal hose onto the outer thread of the supporting sleeve, and fastening the composite hose on the supporting sleeve by radial pressure.

Composite hoses having enclosed metal hose are often used in connection with high pressure conduits which must not only withstand a high interior pressure, but also a high exterior pressure in connection with low interior pressure.

An important area of application of such composite hoses lies in undersea drilling, for example submarine drilling for petroleum or natural gas. Here conduits are usually laid which include an entire bundle of hoses and conduits subjected to different stress (so-called umbilicals). For example, oil extracted from the oil bore hole, and at the same time, suspension, ethanol or extraction gas are conveyed into the oil bore hole. Moreover, as a rule, electrical conduits run in the umbilical pipelines for control of the boring apparatus.

Since such umbilical conduits are usually laid between a drilling rig and an oil bore hole situated on the bottom of the sea, the standards for the outer casing, but also on the individual conduits running therein, are high: The conduits must be flexible, which is generally only guaranteed by hose conduits, and they must at the same time withstand a high outer pressure, and indeed independently of whether an internal pressure of the same order of magnitude or only a negligible inner pressure is present. Depending upon the depth of the boring, a pressure difference of about 300 bar can arise without more, which must not lead to a collapse of the hose lines. Furthermore, the conduits must be so constructed that they do not corrode in aggressive salt water.

A composite hose of the type mentioned at the beginning, where the spiral wound metal hose consists of high grade steel and the outer casing consists of a thermoplastic, generally meets these standards.

Interfacing such composite hoses with attachment fittings or hose couplings is problematic, since in submarine use in particular, sea water must not be allowed to attack the enclosed, wound metal hose due to the danger of corrosion. At the same time, the interface must be pressure-tight toward the inside as well as toward the outside. Also, a certain tensile strength of the interface is indispensable. This problem exists throughout not only in connection with the outer casing of an umbilical hose, but also with the interface of the individual hoses passed in it, which as a rule are likewise composite hoses of the type mentioned at the beginning.

In addition, complicating matters is that the assembly of such connections must often take place on site and in part under severe conditions, for example in high seas, whereby a welding or soldering connection is then hardly producible, or not producible at all.

In U.S. Pat. No. 3,393,267, in another context, a connection element for a composite hose having a spiral wound metal hose and an elastic outer casing is proposed which includes a support sleeve having an outer thread adapted to the metal hose, which thread engages into the helically wound depressions of its interior wall, and an annular, radial sealing surface removed from it.

The supporting sleeve of this known connection element is set on the end of the composite hose to be joined, and the wound metal hose is screwed into the outer thread of the supporting sleeve. The composite hose is fastened by means of a screw sleeve to be placed on the connection element, into which a separate sealing ring is inserted. This sealing ring is deformed upon tightening the sleeve, such that the composite hose is pressed radially on the supporting sleeve, and at the same time the radial sealing surface is sealingly covered by the sealing ring in an axial direction. The outer thread of the supporting sleeve has the sole task of stretching the connection end of wound metal hose, and thus of guaranteeing that the elastic outer casing can in no event project so far beyond the end of the metal hose that it runs on the sealing surface.

For applications which require an interface of composite hoses on attachment fittings or hose couplings under high pressure differences and high tightness standards, there are, however, unsolved problems in connection with the prior art according to U.S. Pat. No. 3,393,267. The stretching of the wound metal hose by the outer thread of the known connection element takes place with deformation of the windings. Even the radial pressing for fastening the composite hose on this connection element presents the danger that the windings of the metal hose are additionally deformed. These deformations could result in the formation of sharp edges of the individual windings, which could possibly pierce the outer casing and thus destroy the sealing action. Furthermore, deformed windings can no longer hold up against high pressures, especially from the outside, so that there exists the danger of the composite hose collapsing in the area of the connection element. Finally, the windings of the metal hose no longer offer defined counter force against pressure at least when they are deformed, thus yielding to radial pressing force. A sealing of the connection element which is secure against high pressure is then no longer guaranteed.

SUMMARY OF THE INVENTION

Underlying the invention is therefore the objective of creating a connection element and a corresponding process with which a composite hose of the type mentioned at the beginning can be joined weld-free and solder-free but nonetheless stably, under defined conditions, tight and especially high pressure-resistant, to a fitting or coupling element.

In accordance with the invention, a connection element for a composite hose of the type mentioned at the beginning includes not only a supporting sleeve with an outer thread adapted to the metal hose which engages into the spiraled depressions of its interior wall, and an annular axial sealing surface bordering on the outer thread, but spaced from the outer thread by a shoulder, which sealing surface is adapted to the outer casing, but also a pressing element acting radially upon the supporting sleeve exclusively in the area of the sealing surface for all around sealing fastening of the outer casing on the sealing surface.

With such a connection element, it is possible to operate according to the process of the invention: The end of the composite hose to be connected is placed upon the supporting sleeve without prior preparation. The outer thread of the supporting sleeve is fitted to the inner-lying, wound metal hose and engages in the spiraled depressions of its inner wall without deforming it. Therefore, the composite hose can be screwed onto the supporting sleeve in a simple manner by means of its metal hose, and thus be fastened on it without tension. After this, the wound metal hose, and only this, is axially compressed, so that the outer casing is exposed projecting beyond the end of the metal hose. The outer casing thereby reaches beyond the end of the metal hose and the outer thread of the supporting sleeve on which this is fastened, and for its part can also be fastened pressure-tight on a sealing surface arranged axially behind the outer thread. With this construction, it can be prevented that the inner hose comes into contact with the surrounding medium, although it is attached pressure and tension-tight on the connection element free of welding and soldering.

Fastening the outer casing on the sealing surface takes place by means of radial pressing. Especially here, the invention offers particular advantages as the pressing only affects the outer casing of the composite hose, but not the wound metal hose. Thus, through a pressing of the wound metal hose its contours would possibly be deformed, and its pressure-tightness, in particular its capacity to resist bending, would thereby be strongly diminished. Since only the outer casing is pressed on the axial sealing surface, and the wound metal hose remains completely free of radial pressing forces, the problems of the prior art described above are eliminated.

The functions of "resistance to tensile stress" and "tightness" of the connection element of the invention are completely separated: The wound metal hose takes over the resistance to tensile stress of the interface without endangering its resistance to shearing stress, and the outer casing of the composite hose takes care of tightness, wherein the pressing on the axial sealing surface takes place under defined and reproducible conditions. In this connection, the sealing action can be improved by appropriate contouring of the axial sealing surface, for example by a number of annular running ring grooves or recesses. Corresponding teeth or ring-shaped projections in the pressing element which a further increase the sealing action.

The process of the invention for joining composite hoses can be conducted at any desired point on a composite hose, since the hose is simply cut to length radially, for example with a saw. After screwing the inner-lying metal hose with the supporting sleeve, the axial compression of the metal hose can take place (optionally intermittently) by pushing the supporting sleeve into the outer casing of the composite hose. Subsequently, only the outer casing must still be attached on the sealing surface, preferably by means of a pressing sleeve, in order to complete the connection of the composite hose to an attachment fitting or a hose coupling.

Besides fastening the outer casing by means of a pressing sleeve, the outer casing can also be inserted into an annular space opening toward the connection hose and be attached in the annular space, for example likewise by pressing. The sealing surface of the invention is then part of the annular space.

The functional capacity of the connection element of the invention is further improved if the outer thread of the supporting sleeve is restricted in relation to the sealing surface by a catch or stop, which is preferably constructed as an annular ring-shaped front face. In this way, screwing on the wound metal hose is, first of all, limited in a defined manner. Secondly, the catch can assume a portion of the forces when the compression of the metal hose over the supporting sleeve takes place.

The spiral wound metal hose preferably comprises folded metal sections, wherein these in turn are preferably constructed as agraffe (hook) profiles. Agraffe profiles have, as is well known, a metallic sealing action with good flexibility, are very subject able to high pressure, as well as axially compressible and stretchable. Above all, the resistance to outside pressure, of particular interest here, is guaranteed by an agraffe profile.

The outer casing of the composite hose is preferably made of plastic, especially a thermoplastic. The outer casing can nevertheless comprise several layers of the same or even different material in order to increase its load-bearing capacity or, if need be, to guarantee a shielding.

The invention can likewise be used in joining individual composite hoses which run, for example, within an umbilical hose conduit, but also definitely serve to interface composite hoses which convey in themselves an entire bundle of individual hoses or conduits. Particularly to be emphasized, in any case, is the simplicity of the solder-free and weld-free assembly, the resistance to tensile stress and pressure safety, especially outside pressure security of the connection of the invention.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiment(s) which are presently preferred. It should be understood, however, that the invention is not limited to the precise arrangements and instrumentalities shown. In the drawings.

DETAILED DESCRIPTION OF THE INVENTION

Figure 1:
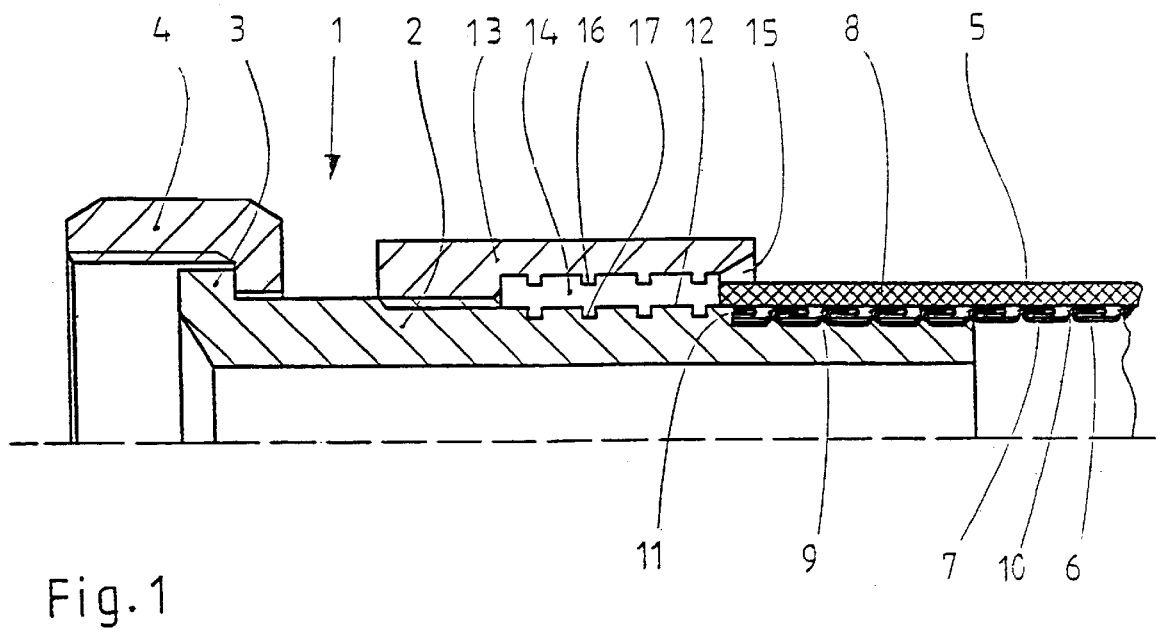
FIG. 1 is a partial section side view of a connection element of the invention in a first processing step.

The connection element 1 partially sectioned in FIG. 1 basically consists of a supporting sleeve 2, which has on its end a flange 3 with associated union nut 4. For connecting a composite hose 5, which here consists of a spiral wound metal hose 6 with agraffe profiles 7 and an outer casing 8 made of an elastomer surrounding this metal hose 6, the supporting sleeve 2 is provided with an outer thread 9 on its end lying opposite the flange 3. This outer thread 9 is configured such that it engages into the depressions 10 lying between the individual agraffe profiles 7. One can thus speak of a hose thread on which the metal hose 6 is simply screwed on. As a rule though, the supporting sleeve 2 is screwed into the composite hose 5. The outer thread 9 is bounded by a shoulder 11 constructed as a ring-shaped annular front face which is joined to an annular, axial sealing surface 12. A pressing sleeve 13 sits screwed on the supporting sleeve 2, which forms an annular space 14 in cooperation with the sealing surface 12. The annular space 14 opens toward the composite hose 5 and is there provided with an insertion incline 15. Finally, the pressing sleeve 13 is provided with a number of teeth 16 which match with recesses 17 in the sealing surface 12.

Figure 2:
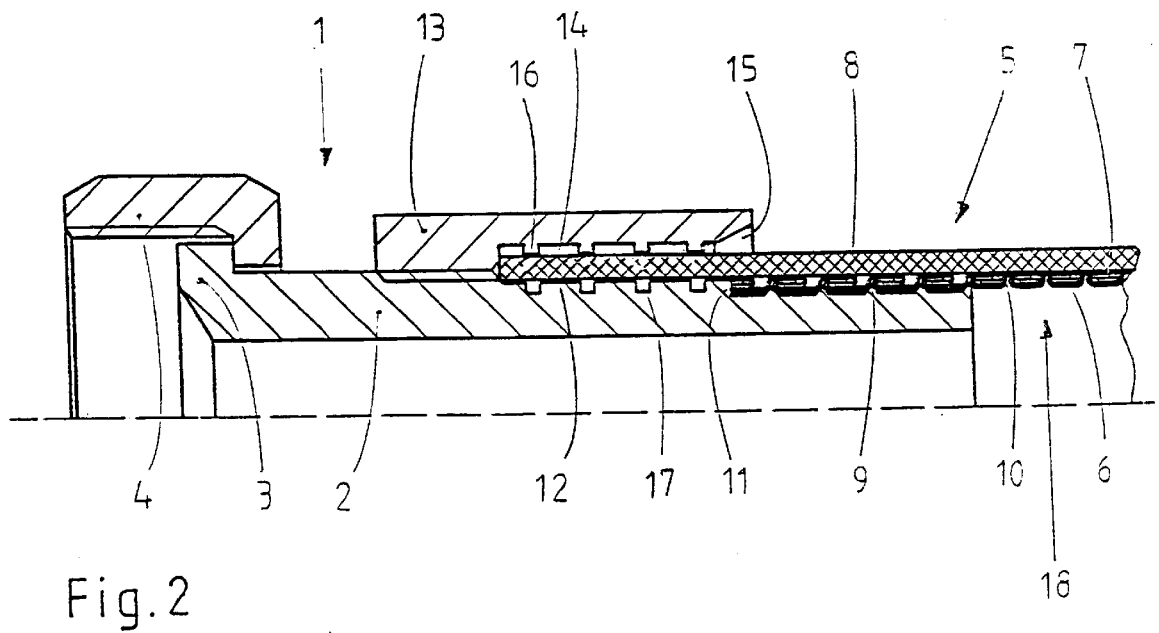
FIG. 2 is a view similar to FIG. 1 but showing a second processing step.
Figure 3:
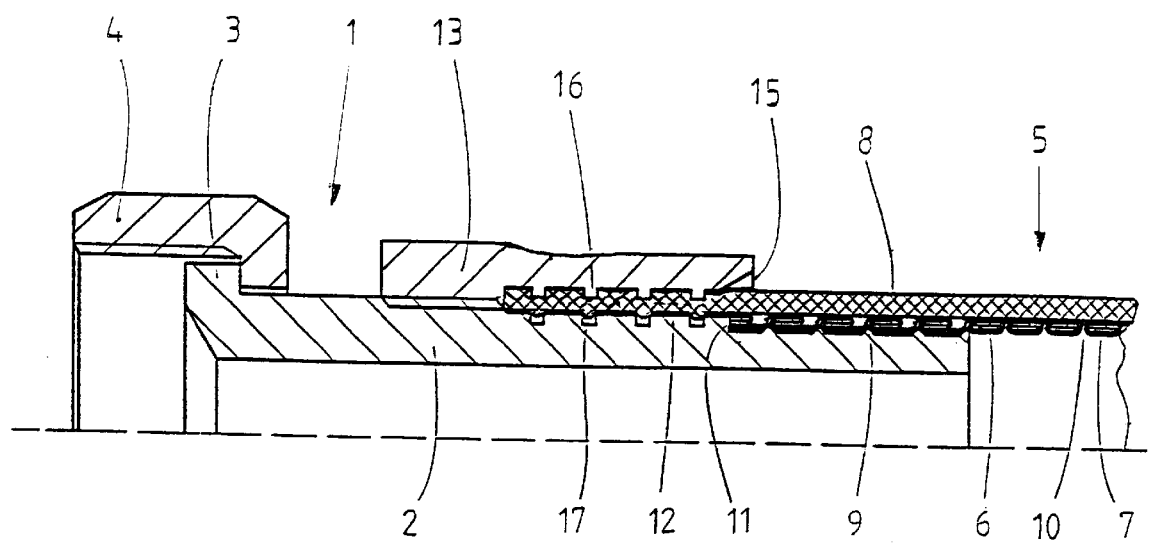
FIG. 3 is a view similar to FIG. 1 but showing a third processing step.

In FIGS. 2 and 3, the individual parts of the represented connection element 1 and the composite hose 5 are respectively provided with the same reference numbers. The manner of functioning of the shown connection element 1, according to the present invention, is as follows:

FIG. 1 shows the arrangement with the composite hose 5 already placed on the connection element 1 or its supporting sleeve 2, wherein the wound metal hose 6 is already screwed onto the outer thread 9 of the supporting sleeve 2 up to the catch or the shoulder 11. The composite hose 5 must thereby merely be separated in an almost radial plane.

The supporting sleeve 2 is then pressed into or struck into the composite hose 5, so that the wound metal hose 6 is pushed back within the outer casing 8. The compressibility of the wound metal hose 6 makes this possible. The outer casing 8 is thereby exposed, projecting over the end of the metal hose 6, and pushed into the annular space 14 between the sealing surface 12 and the pressing sleeve 13. FIG. 2 depicts this processing step in which a compression region 18 of the metal hose 6 can be recognized. The exposed end of the outer casing 8 is here already sitting completely in the annular space 14. Since the pressing sleeve 13 is screwed onto the supporting sleeve 2, inserting the supporting sleeve 2 into the composite hose 5 is limited in a defined manner.

The pressing sleeve 13 is then subjected to compression or crimping in order to complete the interface of the connection element 1 to the composite hose 5. This is represented in FIG. 3.

The present embodiment thus shows a solder-free and weld-free interface of a composite hose 5 to a connection element 1, which can serve as an attachment fitting or as a hose connection coupling. The inner-lying metal hose 6 of the composite hose 5 is fastened to the outer thread 9 of the supporting sleeve with high tensile stability. The outer casing 8, which comprises a thermoplastic or an elastomer, is fastened pressure-tight in the annular space 14 formed by the sealing surface 12 and the pressing sleeve 13. The tightness of this connection is supported by the teeth 16 and the recesses 17. Since the pressing of the outer casing 8 in the pressing sleeve 13 is spaced from the outer thread 9 of the supporting sleeve 2, a deformation of the agraffe profile 7 of the metal hose 6 is ruled out. Its high load-bearing capacity against exterior pressures thus remains preserved to the fullest extent. The tightness against media existing under high pressure from the outside is also reproducible and completely guaranteed, owing to the defined compressive force effected by the interaction of the sealing surface 12 and the pressing sleeve 13 on the elastic outer casing 8. Finally, the metal hose 6 remains completely separated from the surrounding medium so that, for example in submarine use, a corrosion of the metal hose 6 by the surrounding salt water is not to be feared.

It will be appreciated by those skilled in the art that changes could be made to the embodiment(s) described above without departing from the broad inventive concept thereof. It is understood, therefore, that this invention is not limited to the particular embodiment(s) disclosed, but it is intended to cover modifications within the spirit and scope of the present invention as defined by the appended claims.

We claim:

1. A connection element together with a composite hose (5) having a spiral wound metal hose (6) and an elastic outer casing (8), the connection element comprising a supporting sleeve (2) having an outer thread (9) adapted to the metal hose (6), the outer thread (9) engaging into spiraled depressions (10) on an inner wall of the metal hose (6), an annular sealing surface (12) axially bordering on the outer thread (9), spaced from the outer thread (9) by a shoulder (11), and adapted to receive the outer casing (8) in an assembled condition, and a pressing element (13) acting radially exclusively in an area of the sealing (12) on the supporting sleeve (2), wherein in the assembled condition a portion of the metal hose (6) is axially compressed to leave a free end of the outer casing (8) and the pressing element (13) provides annular sealing fastening of the free end of the outer casing (8) on the sealing surface (12).

2. The connection element and composite hose according to claim 1, wherein the pressing element (13) is constructed as a pressing sleeve.

3. The connection element and composite hose according to claim 2, wherein the sealing surface (12) and the pressing sleeve form an annular space (14) adapted to accommodate the outer casing (8) of the composite hose (5).

4. The connection element and composite hose according to claim 1, wherein the spiral wound metal hose (6) comprises metal folded sections having agraffe profiles.

5. The connection element and composite hose according to claim 1, wherein the outer casing (8) of the composite hose (5) is made of plastic.

6. The connection element and composite hose according to claim 1, wherein the outer casing (8) of the composite hose (5) comprises several layers.

7. A process for connecting a composite hose having a spiral wound metal hose encased by an elastic outer casing, comprising the following process steps:

Setting an end of the composite hose to be connected on a supporting sleeve having an outer thread adapted to the metal hose so that the outer thread engages into spiraled depressions on an inner wall of the metal hose;

Screwing the wound metal hose onto the outer thread of the supporting sleeve;

Fastening the composite hose on the supporting sleeve by radial pressure; wherein, Following screwing the wound metal hose onto the outer thread of the supporting sleeve, a portion of the wound metal hose is compressed axially such that the outer casing is exposed projecting beyond the end of the metal hose and comes to lie on an annular sealing surface of the supporting sleeve axially bordering on the outer thread and spaced from the outer thread by a shoulder, the annular sealing surface being adapted to receive the exposed projecting outer casing; and The exposed projecting outer casing of the composite hose is pressed exclusively on the sealing surface so as to be radially sealed therewith.

8. The process according to claim 7, wherein the pressing is conducted with a pressing sleeve arranged on the supporting sleeve which together with the sealing surface forms an annular space adapted to accommodate the outer casing of the composite hose.

9. The process according to claim 7, wherein the compressing of the wound metal hose is undertaken with the aid of the supporting sleeve.

10. The process according to claim 7, wherein the composite hose is cut to size in a radial plane before setting on the supporting sleeve.

11. The process according to claim 7, wherein the outer casing of the composite hose is fastened pressure-tight on the sealing surface.

* * * * *